United States Patent [19]

Janes et al.

[11] 4,155,008

[45] May 15, 1979

[54] VAPOR COATED EMISSIVE CATHODE

[75] Inventors: George S. Janes, Lincoln; Robert E. Schlier, Concord, both of Mass.

[73] Assignee: Jersey Nuclear-Avco Isotopes, Inc., Bellevue, Wash.

[21] Appl. No.: 765,678

[22] Filed: Feb. 4, 1977

[51] Int. Cl.² .................. B01D 59/44; H01J 27/00
[52] U.S. Cl. .................... 250/281; 250/296; 250/298; 250/425; 250/427
[58] Field of Search ............ 313/359; 250/423 P, 250/425, 427, 296, 298, 281

[56] References Cited
U.S. PATENT DOCUMENTS 3,610,985  10/1971  Fleming ..................... 250/427

*Primary Examiner*—Harold A. Dixon
*Attorney, Agent, or Firm*—Weingarten, Maxham & Schurgin

[57] ABSTRACT

A long life, high emission electron source for a plasma environment. The plasma environment is made up of corrosive particles having a lower work function than the exposed material of the electron source. The electron source is operated at an elevated temperature not only to provide free electrons but also to establish and maintain a thin partial monolayer coating of the source's emissive surface with plasma particles in an equilibrium between condensation and evaporation. The equilibrium coating increases the emissivity of the surface without permitting substantial corrosion of the surface or structure from the particles of the plasma environment. The cooler regions of the electron source are shielded from the plasma particles to prevent a build-up of corrosive particles.

17 Claims, 6 Drawing Figures

VAPOR COATED EMISSIVE CATHODE

FIELD OF THE INVENTION

The present invention relates to electron sources, and in particular to an electron source having a thin equilibrium coating of the particles of a plasma environment.

BACKGROUND OF THE INVENTION

In U.S. Pat. No. 3,939,354, assigned to the same assignee as the present application and incorporated herein by reference, there is disclosed a technique for isotope separation, particularly uranium enrichment, in which a uranium vapor flow is selectively photoexcited and ionized, resulting in the generation of a plasma. Ions in the plasma are periodically accelerated towards collecting surfaces by an electrode structure typically comprising a set of adjacent U-shaped channels forming one electrode, and a set of elongate electrodes running through each channel, forming another set of electrodes. It is suggested there that a source for electrons coming other than from the vapor source, may be desired for efficient use of the ion acceleration structure, and means in the nature of a filament are provided for furnishing electrons to the plasma. To supply all of the electrons required for the extraction system from a filament of the type illustrated in the above-identified patent, for example approximately 1 ampere per square centimeter of cross-sectional flow area within the extraction region, using conventional filamentary electron sources, requires a very heavy power consumption and large surface area, particularly when practiced on a production scale.

BRIEF SUMMARY OF THE INVENTION

In accordance with the teaching of the present invention a filamentary supply of electrons for an accelerated plasma is operated to maintain a thin, partial monolayer coating of plasma particles to enhance emission without substantial shortening of filament life time from particle corrosiveness.

In a preferred embodiment of the invention, a filamentary, or cathodic, source of electrons is provided in a vapor which has been ionized with isotopic selectivity. The source of electrons is operated to provide electrons to this plasma for assisting in the MHD acceleration of the selectively ionized particles. For this purpose, the uranium, which has a far greater electron emissivity than materials typically useful for electron emitting filaments or cathodes, is permitted to establish an equilibrium, thin layer coating or partial monolayer, on the source surface. Condensation and re-evaporation of the vapor from the filament or cathode surface occurs at a rate governed by vapor flow rate and temperature of the source in a self-compensating manner to facilitate maintenance of the partial monolayer. The thin uranium coating of the filament or cathode greatly increases electron emissivity, thereby reducing the surface area and heater power required for electron emission at levels useful for supplying current to the plasma during ion acceleration.

The layer of uranium on the emitting surface is, however, kept thin by heating to promote re-evaporation. This prevents penetration of the filament or cathode by condensed uranium, which, due to its corrosivity, can readily lead to a rapid deterioration in the filament or cathode. In end regions of the filament or cathode where the temperature is likely to be reduced, shields are placed around the electron emitting surface to inhibit the condensation of vapor where it would be more likely to accumulate in undesirably thick coatings.

BRIEF DESCRIPTION OF THE DRAWING

These and other features of the present invention are more fully set forth below in the detailed description presented solely for purposes of illustration and not by way of limitation, and in the accompanying drawing of which.

DETAILED DESCRIPTION OF THE INVENTION

There is provided in the present invention a long life, high emission source of electrons for a plasma environment. The source is used within a vapor of particles having a high emissivity (or low work function) and the particles are advantageously allowed to coat the source to a thin layer by maintaining an equilibrium between condensation and re-evaporation rates. The thin layer, a partial monolayer, insures an increase in electron emissivity but prevents source degradation from penetration by the particles.

The present invention is preferably operative within a system for uranium isotope separation or enrichment wherein a vapor of uranium is generated and directed into a region where it is selectively ionized and accelerated onto trajectories for collection apart from the vapor. The electron supply is provided in the system to insure a sufficiency of electrons in the vapor for efficient ion acceleration by crossed-field MHD forces. It is preferably operated to avoid having the vapor source become an electron supply in order to reduce over excitation of the vapor which depletes the ground or low-lying energy states in the uranium vapor prior to isotopically selective ionization. In the case of a uranium vapor, which has a much higher electron emissivity than typical electron source materials such as tungsten filaments, the thin coating of the uranium vapor on the emissive surface greatly reduces the required surface area and heating current for effective electron generation.

Figure 1:
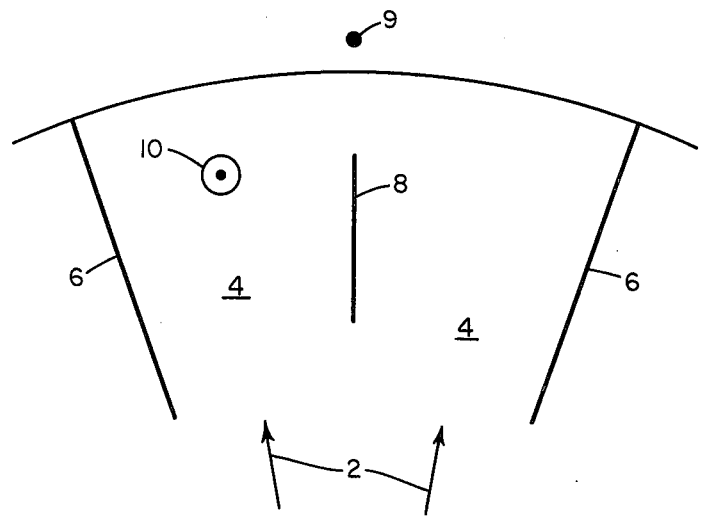
FIG. 1 is a simplified diagram of a module for uranium enrichment in which the present invention is useful.

A uranium enrichment module with which the present invention is associated is shown in a simplified form in FIG. 1. Within a chamber, not shown, a flow 2 of uranium vapor is directed into a region 4 between plates 6 which extend into the page a distance several times their dimension in the flow direction. Isotopically selective ionization of the U-235 isotope is produced in region 4 and the ions thus produced accelerate toward plates 6 by an electric field applied between plates 6 and an intermediate electrode 8 in cooperation with an orthogonal magnetic field 10. The effectiveness of the acceleration of ions toward plates 6 depends upon the availability of a number of electrons within the region 4 for circulation about electrode 8 in response to the electric and magnetic fields. While electrons exist and are created within the region 4 it is desired to provide an additional supply as from a filament or cathode 9.

The electron emitting structure 9, a filament or cathode typically of tungsten because of the required high operating temperature, will have an electron emissivity increasing with temperature in accordance with the Richardson equation. This structure when placed in the flowing uranium vapor of a uranium laser enrichment module will receive and be coated by uranium particles. At a low filament or cathode temperature uranium will heavily coat the emissive surface, drastically increasing electron emissivity, but also rapidly destroying the filament or cathode from its corrosive properties. At very high temperatures, the uranium condensing at the emissive surface will be re-evaporated too fast to affect emissivity or life time appreciably. Normally one would operate in this range to avoid significant accumulations of detrimental uranium deposits on the filament.

These factors which govern electron emissivity and the extent of uranium coating on the filament or cathode have now been utilized to provide a long life structure with increased emissivity and a tendency to be self-regulating for the desired electron supply. At a range of temperatures, described below, uranium will thinly coat the tungsten or other structure with less than complete surface coverage, what may be termed a partial monolayer. The degree of surface coverage is dependent both upon surface temperature and the flow rate of the uranium vapor. For a given flow rate, it is possible to prescribe a desired number of electrons per unit length of the separation system. With a known surface area for the emitting surface which is sufficient to supply this number with a partial uranium coating, the minimum temperature at which this partial coating is achieved can then be calculated. The temperature is set by a selection of a corresponding electrical current used to heat the filament or cathode. Any variation in temperature varies not only the degree of emissivity of the total structure by varying the uranium surface concentration, but also varies the emissivity of the uranium by the effect of the Richardson law. These effects work oppositely, giving the desired electron emission current a degree of temperature independence. It is thus important to have a surface area sufficient for the desired electron current density.

The surface concentration of uranium on the emitting structure when operated in the range of a partial coating will increase with flow rate of the vapor. This effect is also desirable in that it will provide self-regulation in the electron current supplied to the plasma. As plasma and thus ion density increase, then so will electrons supplied to it to insure operation of the acceleration structure.

Figure 2:
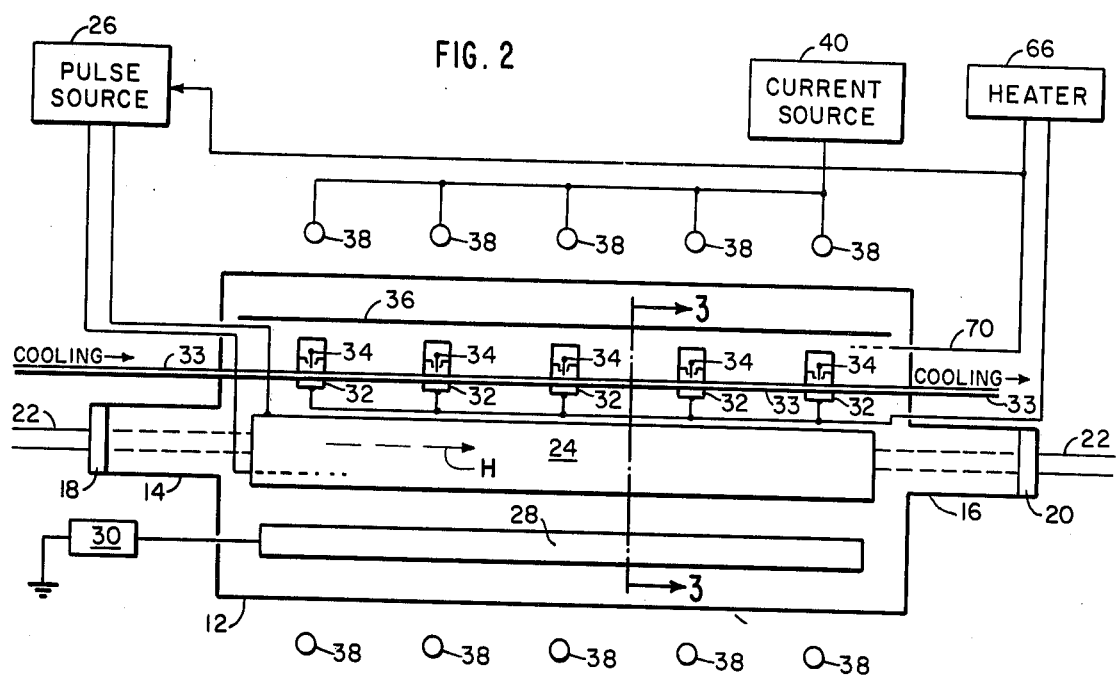
FIG. 2 is a side diagrammatic view of apparatus with which the present invention is employed.

The complete structure and operation of the present invention may now best be understood by reference to the Figures beginning initally with FIG. 2 showing a side view of an isotopically selective ionization and ion extraction system within which the present invention is useful. As shown there, a chamber 12 of the type illustrated above and in U.S. Pat. No. 3,939,354, commonly assigned and incorporated herein by reference, is evacuated to a relatively low pressure of approximately $10^{-5}$ torr. The chamber 12 has extension pipes 14 and 16 on opposite ends into which are fitted optical quality windows 18 and 20 to receive and pass a composite laser beam 22. Beam 22 is adapted for isotopically selective ionization and is applied through a set of extraction plates 24 which are activated by a pulse source 26 in response to a timer (not shown) all as indicated in the above-referenced patent. The extractor plates 24 are positioned above a uranium vapor source 28 which is typically an electron beam vapor source and which is connected either directly or through an impedance 30 to ground. Directly above the extractor plates 24 are a series of conductive blocks 32 supported on cooling tubes 33 which run within the chamber 12 the length of the extractor plates 24. Each block 32 supports a filament 34, typically of tungsten, running into and out of the page above the extractor plates. The five filaments 34 illustrated in FIG. 2 are for exemplary purposes only, the actual number and size being determined in accordance with the considerations for emissive surface area discussed below.

Directly above the assembly of conductive blocks 32 and filaments 34 is a plate or assembly 36 provided to collect vapor not separated by the extraction plates 24. The assembly 36 is typically grounded.

Surrounding the chamber 12 is a series of coils 38 supplied with current from a current source 40 to provide a magnetic field H within the chamber 12 generally parallel to the direction of laser beam 22.

Figure 3A:
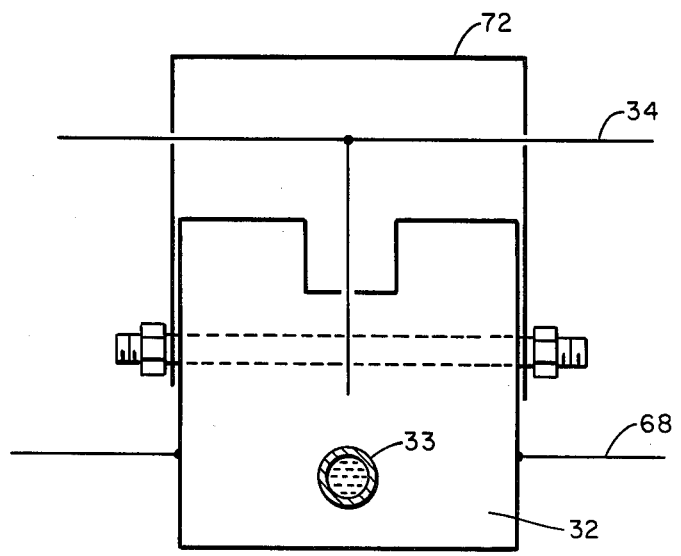
FIG. 3A is an expanded view of a portion of FIGS. 2 and 3.
Figure 3:
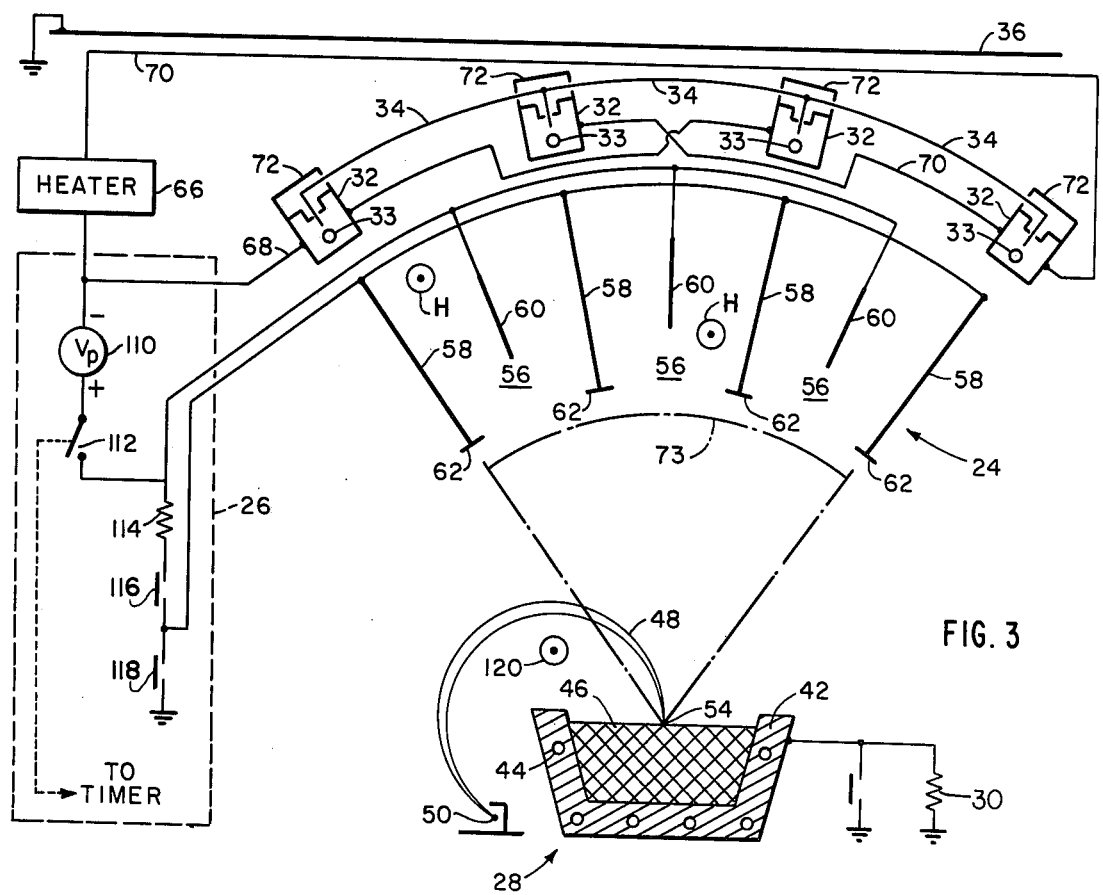
FIG. 3 is an interior sectional diagrammatic view of the apparatus of FIG. 2.

A sectional view, showing details of the present invention in better representation, is shown in FIG. 3. As shown there, the vapor source 28 includes a crucible 42 having ports 44 for a cooling fluid such as water. The crucible 42 contains a supply of uranium 46 which is melted and vaporized by the energy in electron beam 48 from a filament 50 and associated electrodes. The crucible 42, typically of copper, contacts the uranium metal 46 and is itself either directly connected to ground or connected to ground through high impedance 30 as illustrated. This connects the point of vaporization 54 either directly to ground or to ground through a high impedance for purposes mentioned below.

Uranium vapor generated from the point of vaporization 54 expands radially upward into the region of the extractor plates 24 where it passes through a plurality of chambers 56 defined by side plates 58 which are electrically connected together, typically at the ends thereof near the pipes 14 or 16 illustrated in FIG. 1. Centrally within each chamber 56 is a shorter flat electrode 60 similarly extending within each chamber 56 substantially the length of the chamber 12. Each electrode 60 is connected together in circuit to the pulse source 26. Preferably, shadow shields 62 are placed on the ends of the plates 58 facing the vapor flow.

The plate 36, used for the collection of vapor not selectively ionized and extracted for collection onto plates 58, is placed sufficiently above the chambers 56 to make room for the assembly of filaments 34, tubes 33 and blocks 32. As shown in FIG. 3, the filaments 34 are typically provided in short sections, each extending circumferentially about the point of vaporization, an angle substantially coextensive with the angle formed between each set of plates 58 in each chamber 56. The filaments 34 are supported from the blocks 32. Current is supplied to them from a heater supply 66 along appropriate connection busses 68 and 70.

Since the filaments 34 are likely to run hottest in the center and cooler towards the ends, they are shielded by enclosures 72 at the points where they approach the cooled blocks 32 in order to prevent the collection of uranium vapor at these cooler parts for purposes explained below. Reference is here made to FIG. 3A for an expanded view of the supports.

As indicated above, the filaments 34 are intended to be run at a temperature which permits the formation of a coating of uranium condensed from the vapor in equilibrium with continuous revaporization of the uranium so that only a thin layer, or incomplete monolayer of uranium collects on the filaments 34. This insures a sufficient area of hot uranium to vastly improve the emissivity of the filaments 34, by as much as more than several orders of magnitude, but at the same time prevents the build-up of a layer of uranium which would ultimately penetrate the tungsten filament 34 and cause its early failure. In order to insure this condition, the tungsten wire 34 is advantageously operated in the temperature range of 2500°–3000° K. by the heating effect of current from the heater 66.

In such case, two substantial benefits accrue, the surface area required for the desired electron emissivity can be greatly reduced in combination with a reduction in the required heater power. For an exemplary case, where it is desired to provide approximately 1 ampere of electron current per cm of length in each chamber bounded by plates 58, and where the vapor flow provides a vapor density of approximately $3 = 10^{13}$ particles per cm$^3$, a typical surface area of 0.1 cm$^2$ per cm of chamber length may be used with the uranium coated filament. In addition, a heater power sufficient to maintain the above stated temperature range at the emitting surface may be achieved with available technology. Such values above are intended to be exemplary only, to indicate the relative improvement achieved with the device described above. Other operating points within an acceptable operating range to achieve the above-desired results may be chosen. The filament structure shown above may alternatively be located on the other side of plates 58, in the region of line 73.

Figure 4:
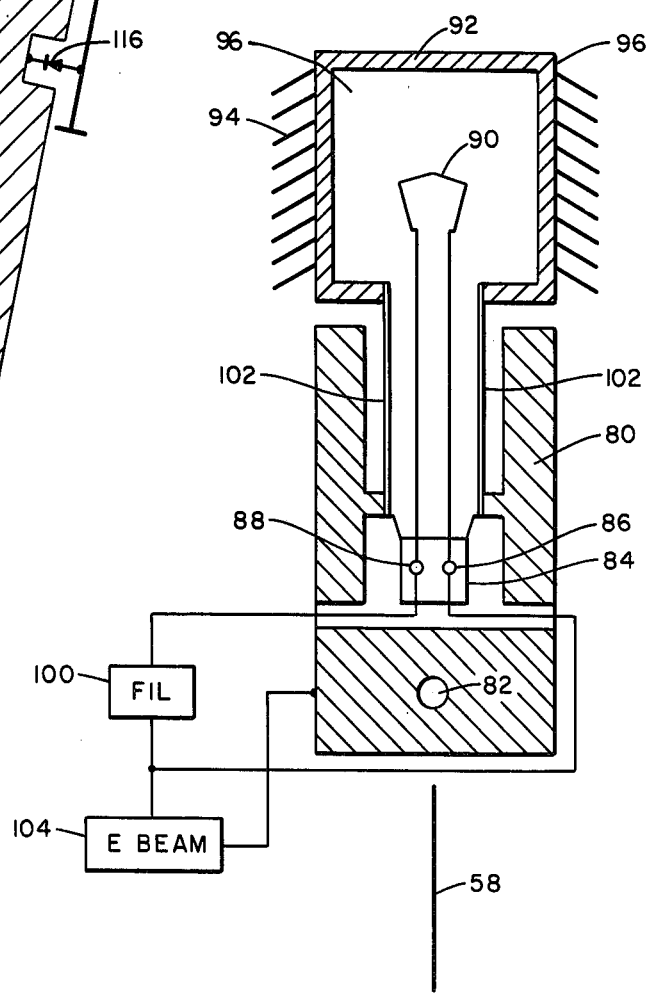
FIG. 4 is a sectional view of an alternative cathode and electron emitter for use in the invention of FIGS. 1 and 2.

With reference to FIG. 4, there is shown an alternative embodiment for an electron emission surface. The view of FIG. 4 is a sectional diagram representative of several locations along each of the plates 58. These structures include a generally O-shaped channel member 80 which typically extends the length of the plate 58. Member 80 may typically be of copper or other thermally conductive material and includes a cooling port 82 for the flow of a cooling liquid such as water. Within a bottom portion of the O-shaped channel member 80 is an insulator 84 supported on first and second rods 86 and 88, running the length of the plates 58, and carrying electrical energization for a plurality of filaments 90 which, at several locations, extend above the O-shaped channel member 80. Each filament 90 extends into the cavity of a corresponding one of plural inverted enclosures 92. Each enclosure 92 is typically formed of tungsten and has electron emitting surfaces provided by a plurality of tungsten fins 94 extending at an acute angle outward from vertical sides 96 of the enclosure 92.

The filament 90 is energized by current from a filament energization source 100 through the rods 86 and 88. Heating of the enclosure 92 and particularly of the fins 94 is preferably achieved by drawing a space charge limited electron current from the filament 90 to the enclosure 92. For this purpose, the enclosure 92 is electrically connected and supported by plates 102 around filament 90 and extending into and contacting the O-shaped channel member 80. An electron current source 104 is then provided to supply power for an electron beam current from the filament 90 to the enclosure 92 via the O-shaped channel member 80. Typical dimensions for the structure of FIG. 3 are a one centimeter diameter for the enclosure 92. Typical frequencies of placement are governed by the above exemplary figures for the filamentary source. The structure of FIG. 4 thus provides a very efficient and compact source for supplying electrons to the plasma.

Figure 5:
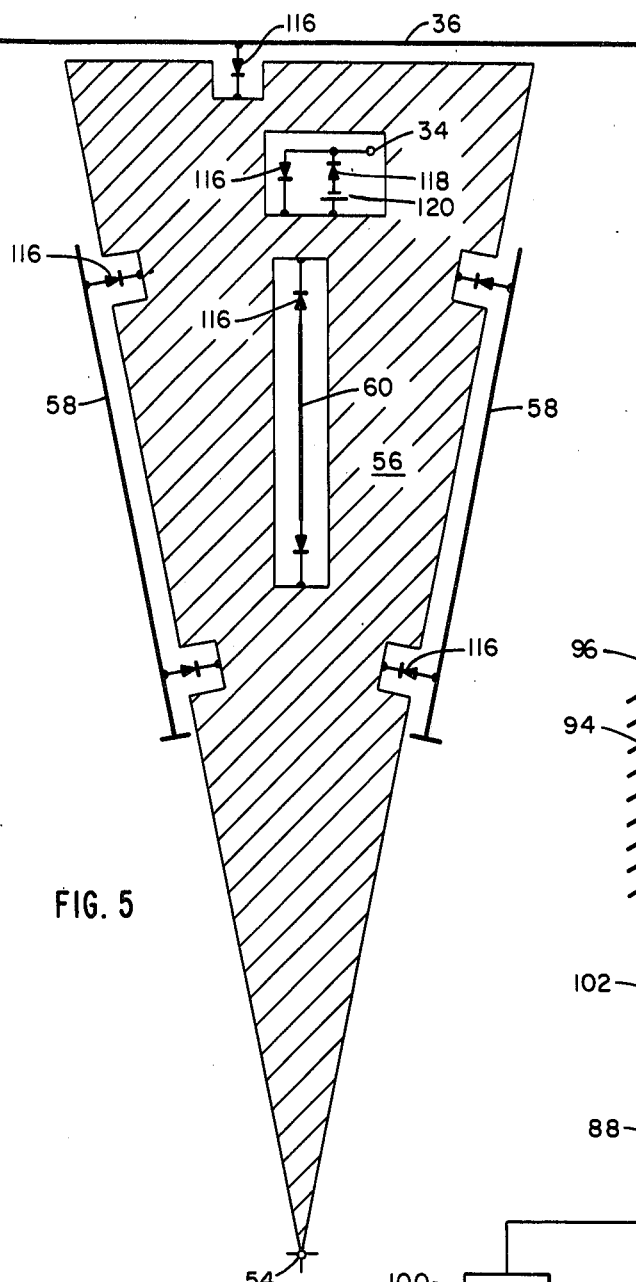
FIG. 5 is a view of a portion of the apparatus of FIG. 2 indicating a partial equivalent circuit useful in explaining the operations of FIGS. 2 and 3.

With the structure described above which provides an efficient source of electrons to the plasma environment created by isotopically selective photoexcitation and ionization, it is advantageous to employ circuitry such as illustrated in FIG. 3 and explained with respect to FIG. 5 for providing the extraction potential that accelerates the ions within the chambers 56 toward collection plates 58.

As shown in FIG. 3, the pulse source 26 includes a voltage source 110 having a positive terminal thereof connected through a switch 112 to the anode plate 60 within the chamber 56. The plate 58 may also be connected to the voltage source 110 through the switches 112 and 116 and through a resistor 11 or may be connected directly to ground through switch 118. It may also be left floating as is more fully explained below. The negative potential from the voltage source 110 is applied to one side of the heater supply 66 to connect the potential to the filament 34. At the same time, the melt 46 of uranium being vaporized is connected through the crucible either directly to ground or through the resistor 52 to ground as explained above. These arrangements of voltage application are employed in order to remove the melt as a source of electrons because the electrons streaming from the melt 54 with the vapor flow into the chamber 56 create overenergization of the vapor to the point where an undesirable number of ground and lower energy state particles are energized and made unavailable for selective photoionization without the use of further laser frequencies which is not desired.

With reference to FIG. 5, the operation of this electrical energization structure is more clearly illustrated. As shown in FIG. 5, the plates 58, 60, 36, as well as filament 34 all contact the plasma generated within the chambers 56 with the equivalent of a diode characteristic represented by the diodes 116. These diodes represent the fact that the plates can effectively receive electrons from the plasma but unless they are otherwise an electron emitting surface, will not contribute electrons to the plasma. The filament 34 being operated as an electron emissive surface can contribute electrons as accordingly represented with a parallel combination of an additional, oppositely directed diode 118 and series voltage drop 120. The voltage drop 120 represents a simplification of a space charge and resistance effects which must be overcome for conduction to occur. With the configuration illustrated in FIG. 3 and with the melt grounded along with the plates 58, the extraction potential is applied directly to the plasma environment through the filaments 34 on the one hand, and on the other through the anode plates 60. In this configuration, the cathode represented by the filaments 34 is effectively floated with respect to circuit common which includes the collector plate 36 and the uranium supply 46. In this case, current will be drawn through the plasma between the filament 34 and the plates 60.

Although the vapor source is essentially out of the circuit, there is still a potential for drawing some although a greatly reduced, electron current from the vapor source to the anode plates 60. This current is a consequence of electrons flowing from the filament 34 to the plates 58 instead of the plates 60. That current is then balanced by an electron flow from the vapor source to the anode 60. A reduction in this effect can be achieved in this phenomenon by connecting the collecting plates 58 through the resistor 114 as illustrated or by allowing them completely to float.

In addition, it is important to prevent the collection plates 36, which are in circuit ground, from serving a purpose similar to that of plates 58. This can be assured by allowing the uranium supply 46 to float or partially float as by connecting it through the impedance 30 to ground. A limitation upon the degree to which this effect may be achieved is the secondary or skip electrons generated from bouncing of the electrons in the beam 48 from the surface of the melt 46. The electrons thus released contribute to a current flow from the melt to ground which may make a truly floating melt or vapor source difficult to obtain.

Nevertheless, the structure illustrated above is effective in greatly reducing the electron current drawn from the melt, and in supplying instead electrons from the filament 34 or cathode 92. This results in greatly reducing the super-energization of the vapor flow before it is selectively photoexcited and ionized and efficiently improving the operation of the accelerating electrodes. The voltage applied in pulses to the chambers 56 for acceleration of the ions for collection on the plates 58 is then assured a supply of electrons for effective operation in conjunction with magnetic field 22 as is more fully described in the above-referenced U.S. Pat. No. 3,939,354.

The above described preferred embodiment of the present invention is presented in exemplary structure for purposes of illustration and not by way of limitation. Alterations and modifications are intended to fall within the scope of the invention as is only limited in accordance with the following claims.

What is claimed is:

1. An electron source for a plasma environment comprising:
    means for generating a vapor of a material of a first type in a region;
    means for supplying electrons from a surface thereof of a material of a second type to the region of said vapor;
    said material of said second type having an electron emissivity substantially lower than the material of said first type;
    means for maintaining a partial coating of the surface of said electron supplying means by condensation of vapor particles of said material of said first type in equilibrium with revaporization of said particles to said region from said surface.
2. The system of claim 1 wherein said means for maintaining partial coating maintains a temperature in the range of approximately 2500° K. to 3000° K. for the surface of said electron supplying means.
3. The system of claim 1 wherein said electron supplying means includes a heated filament.
4. The system of claim 3 wherein said filament comprises tungsten and said vapor includes uranium particles, whereby the emissivity of the tungsten filament is substantially increased by the partial coating of uranium particles.
5. The system of claim 3 further including means for shielding terminal portions of said filament which are relatively cooler than other portions of said filament against a coating of said terminal portions by condensation of vapor particles thereon.
6. The system of claim 1 wherein said electron supplying means includes a cathode and said means for maintaining a partial coating includes means for heating said cathode.
7. The system of claim 6 wherein said heating means includes an electron source operating to supply an electron current to said cathode.
8. The system of claim 7 wherein said cathode substantially surrounds said electron source.
9. The system of claim 7 wherein said electron current is space charge limited.
10. The system of claim 8 wherein:
    said cathode includes a plurality of fins angled outward from said cathode.
11. The system of claim 1 further including:
    means for ionizing particles of said vapor;
    means for extracting ionized particles in said plasma for collection on a substrate.
12. The system of claim 11 wherein:
    said extraction means includes a plurality of chambers forming plural adjacent channels fabricated of generally electrically conducting materials, and an electrode located within each said channel; and
    said vapor source includes means for generating a vapor flow directed into said channels through open ends thereof.
13. The system of claim 12 wherein said electron supplying means is located closer to said extracting means than said vapor generating means.
14. The system of claim 12 wherein said electron supplying means is located on the side of said extracting means towards said vapor generating means.
15. The system of claim 12 where said electron supplying means is located on the side of said extracting means away from said vapor generating means.
16. The system of claim 11 wherein said means for ionizing particles includes means for providing isotopically selective photoexcitation and ionization of a selected isotope type particle in said vapor.
17. The system of claim 11 wherein said extraction means includes means for providing sequences of pulsed crossed-field MHD acceleration forces to the ionized particles.

* * * * *

UNITED STATES PATENT AND TRADEMARK OFFICE
CERTIFICATE OF CORRECTION

PATENT NO. : 4,155,008
DATED : May 15, 1979
INVENTOR(S) : G. Sargent Janes and Robert E. Schlier It is certified that error appears in the above—identified patent and that said Letters Patent is hereby corrected as shown below:

| | | |
|---|---|---|
| Column 5 | line 17, | "2500° - 3000° K." should read —2500° - 3000° K—; and |
| | line 23, | "1 ampere" should read —one ampere—; and |
| | line 26, | "$3=10^{13}$" should read — $3 \times 10^{13}$ —. |
| Column 6 | line 23, | "resistor 11" should read —resistor 114—. |
| Column 8 | line 1, | "2500° K. to 3000° K. should read —2500° K to 3000° K—. |

Signed and Sealed this

Thirteenth Day of January 1981

[SEAL]

Attest:

SIDNEY A. DIAMOND

Attesting Officer

Commissioner of Patents and Trademarks